UNITED STATES PATENT OFFICE.

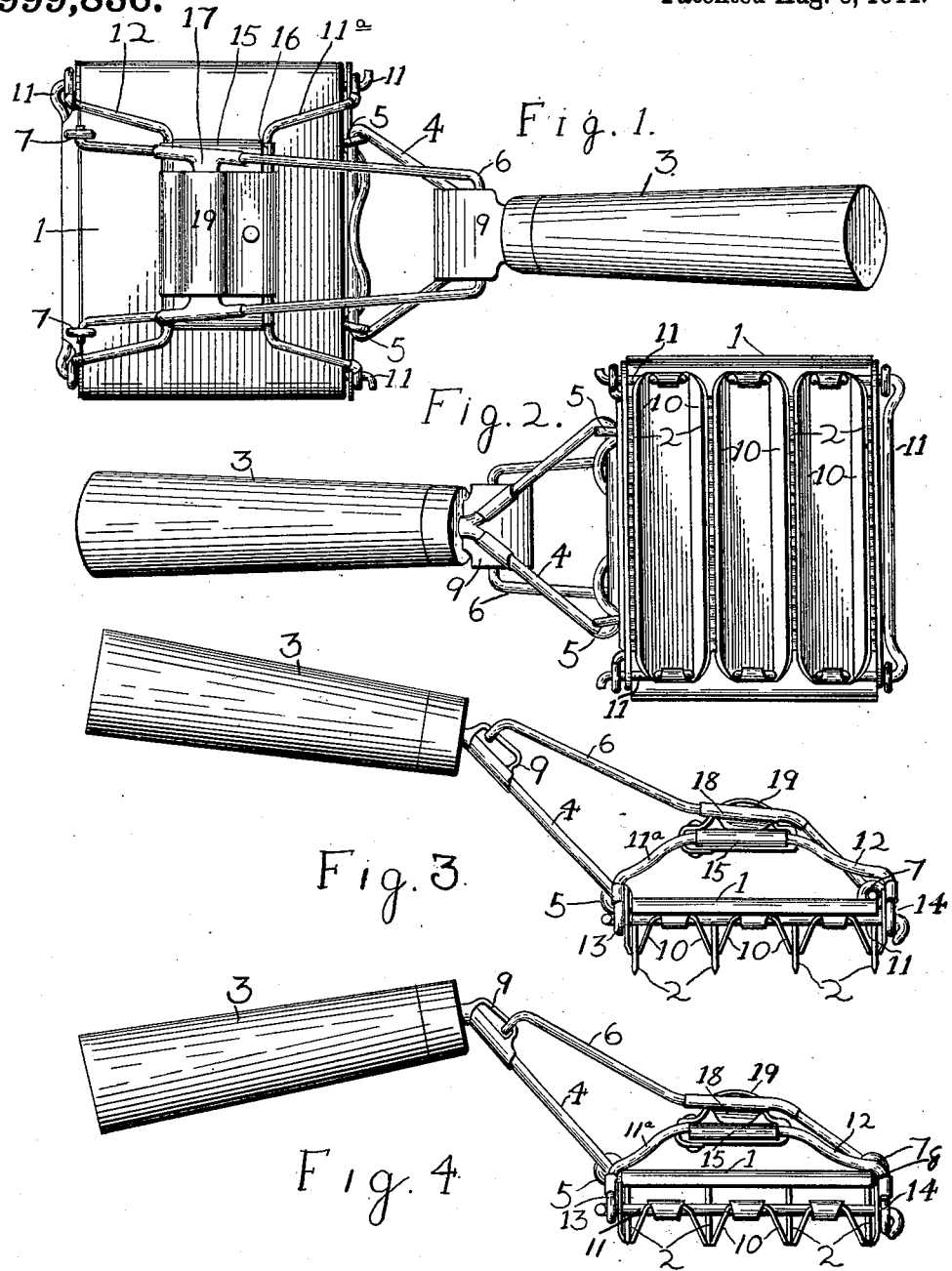

SOREN I. MORKRE, OF FRANKLIN, WISCONSIN.

SELF-CLEANING CURRYCOMB.

999,836.  Specification of Letters Patent.   Patented Aug. 8, 1911.

Application filed July 31, 1909. Serial No. 510,685.

*To all whom it may concern:*

Be it known that I, SOREN I. MORKRE, a citizen of the United States, residing at Soldier's Grove, in the town of Franklin, county of Vernon, and State of Wisconsin, have invented a new and useful Self-Cleaning Currycomb, of which the following is a specification.

My invention relates to improvements in self-cleaning curry comb; and the object of my invention is to provide a curry comb in which the teeth or combs may be cleaned by blades or scrapers attached to the curry comb in such a manner that by reciprocating the scraper blades and combs one in relation to the other the combs will be cleaned by the blades.

The invention comprises a plate provided with a series of combs, and a frame carrying a number of scraper blades arranged so as to contact with the sides of the combs, and levers connecting the comb carrying plate with the handle of the curry comb in such manner that when the curry comb is in use the combs will be projected below the edge of the scrapers, and when the combs are to be cleaned pressure upon the levers will lift the comb carrying plate so that the combs will be scraped by the scraper blades so as to free them from accumulating material.

The features of the invention will be hereinafter particularly described and then sought to be clearly defined by the claims, reference being had to the accompanying drawings forming a part hereof and in which:

Figure 1 is a top plan view of the curry comb; Fig. 2 is a bottom plan view of the curry comb; Fig. 3 a side elevation of the curry comb, showing the parts in position with the combs projected for currying; and Fig. 4 a side elevation showing the combs in their elevated position in relation to the scraper blades.

In the drawing the numeral 1 designates a back plate provided with any desired number of combs 2 attached thereto in any suitable manner. To this back plate a handle 3 is connected by a bail 4 which passes through eyes 5 preferably so as to turn therein, and also by a second bail 6 which extends to the rear of the back plate and at that point has its ends passing through eyes 7 so as to turn therein. These eyes may be formed on the ends of heavy wires 8 extending across the under side of the back plate 1 and soldered or otherwise attached thereto. The forward end of the bail 6 passes through a loop 9 formed on the bail 4.

The numeral 10 designates a number of scraper blades which are secured in any appropriate way to a bottom frame which may consist of a heavy wire 11 passing through the scraper blades 10 and having bails 11ª and 12 connected thereto by eyes 13 and 14 as illustrated, or otherwise. These bails 11ª and 12 extend upwardly over the back plate 1 and are connected one to the other above the back plate by metal plates 15 and 16, or otherwise, the whole forming a rigid frame which carries the scraper blades. The combs of the back plate pass between these scraper blades so that the edges of the latter will bear against the sides of the combs as illustrated in Figs. 2, 3, and 4 of the drawing. The bail 6 connected to the handle 3 is provided centrally with a connecting bridge piece 17 which will bear on the plate 15 which connects the bails 11ª and 12 and may have on its under side a curved portion 18 to bear against the plate 15. A band 19 may encircle the plate 15 and bridge 17 as illustrated.

By constructing the parts as described there is formed a lower frame carrying scraper blades and an upper frame carrying the combs which will pass between the scraper blades, the upper frame having connected thereto at front and rear bails connected with the handle and serving as levers for raising and lowering the top plate with the combs carried thereby in relation to the scraper blades so that the combs can be projected when the top plate is lowered as shown in Fig. 3 in the operation of currying, and so that by raising the top plate as illustrated in Fig. 4 the combs will be retracted between the scraper blades and the latter will scrape off accumulated matter from the combs.

The bail lever 6 has its fulcrum on the plate 15, and the bail lever 4 has its fulcrum on the end of lever 6 where it passes through the loop 9 so that when the handle 3 is depressed the lever 4 will lift the forward end of the comb carrying plate and the outer end of lever 6 will lift the rear end of the same plate and thus raise the combs between the scraper blades so that they will scrape and clean the combs. When the handle 3 is raised the lever 4 will bear down on the front end of the comb carrying plate and the lever 6 will carry down the rear end of the plate so that the combs will be projected below the scraper blades into currying position. If the handle 3 be held firmly and a downward pressure of the hand be applied on top of the bails 11ª and 12 the comb carrying plate will be raised by the action of the levers 4 and 6 the same as if the handle 3 were depressed; and if the curry comb be applied to the body of the animal when the parts are in the position shown in Fig. 4 and the handle be pressed upward the parts will be brought to the position shown in Fig. 3.

I have illustrated and described the preferred construction of the several parts but changes can be made therein without departing from the feature of the levers acting on the front and rear ends of the curry comb to project and to retract the combs in relation to the scraper blades.

Having described invention what I claim is:

1. A curry-comb comprising a frame carrying combs, a frame carrying scraper blades, and levers connected with the comb carrying frame for projecting and retracting the combs and scraper blades one in relation with the other, one of said levers having its fulcrum on the other lever, substantially as described.

2. A curry comb comprising a frame carrying combs, a frame carrying scraper blades, a handle, a lever connecting the handle with the comb carrying frame, and a lever connected with said lever and with the comb carrying frame, the handle lever having its fulcrum on said second lever and the latter having its fulcrum on a part of the scraper blade frame, for projecting and retracting the combs and scraper blades one in relation to the other substantially as described.

Dated May 4th 1909.

SOREN I. MORKRE.

In presence of—
C. J. SMITH,
SAMUEL SMITH.

---

Copies of this patent may be obtained for five cents each, by addressing the "Commissioner of Patents, Washington, D. C."